UNITED STATES PATENT OFFICE.

HENRY C. MAY, OF BOWMAN, NORTH DAKOTA.

BREAKFAST FOOD.

1,245,255.

Specification of Letters Patent.

Patented Nov. 6, 1917.

No Drawing.

Application filed January 29, 1917. Serial No. 145,259.

*To all whom it may concern:*

Be it known that I, HENRY C. MAY, a citizen of the United States of America, and resident of Bowman, in the county of Bowman and State of North Dakota, have invented certain new and useful Improvements in Breakfast Foods, of which the following is a specification.

This invention relates to processes for producing cereal products and particularly to the production of what are termed "breakfast foods."

An object of this invention is to treat white corn, in particular, so that the resultant product consists of baked or parched, finely divided particles of the kernel, free of hull or non-nutritive properties.

With the foregoing and other objects in view, the invention consists of the process or steps by which the corn is treated and in carrying out the process, the corn is first subjected to treatment for the removal of the hull.

After the hull has been removed from the corn, it is placed in the receptacle and subjected to the action of boiling water, the said boiling water being poured in the receptacle and the water and corn being then allowed to stand for from twenty to twenty-four hours or until cool.

The corn is then ground very fine, in a moist state, and the product of the grinding operation is placed on a metallic surface having a temperature sufficiently high to parch or cook the corn applied to it, the said corn being subjected to this treatment until, while in thin layers on the plate, it becomes brittle. When the cooking process has been carried to the degree where the said flakes are brittle and white, they are removed from the metallic plate and are in condition for use.

It has been found in practice that the product resulting from this process is of great nutritive value and that it is highly palatable and of good flavor.

I claim

1. The herein described process for the treatment of white corn, consisting of removing the hull from the corn, adding boiling water to the corn and without subsequent boiling allowing it to stand until cool, in grinding the moist corn and parching the same.

2. The herein described process for the treatment of white corn consisting in removing the hull from the corn, adding boiling water to the corn and without subsequent boiling allowing it to stand from twenty to twenty-four hours, grinding the corn while moist and applying the corn in thin layers to heating plates for parching the same.

HENRY C. MAY.

Copies of this patent may be obtained for five cents each, by addressing the "Commissioner of Patents, Washington, D. C."